Jan. 4, 1949.     O. R. NEMETH     2,457,914
CONVERTIBLE FILM GATE CONSTRUCTION
Filed May 22, 1944
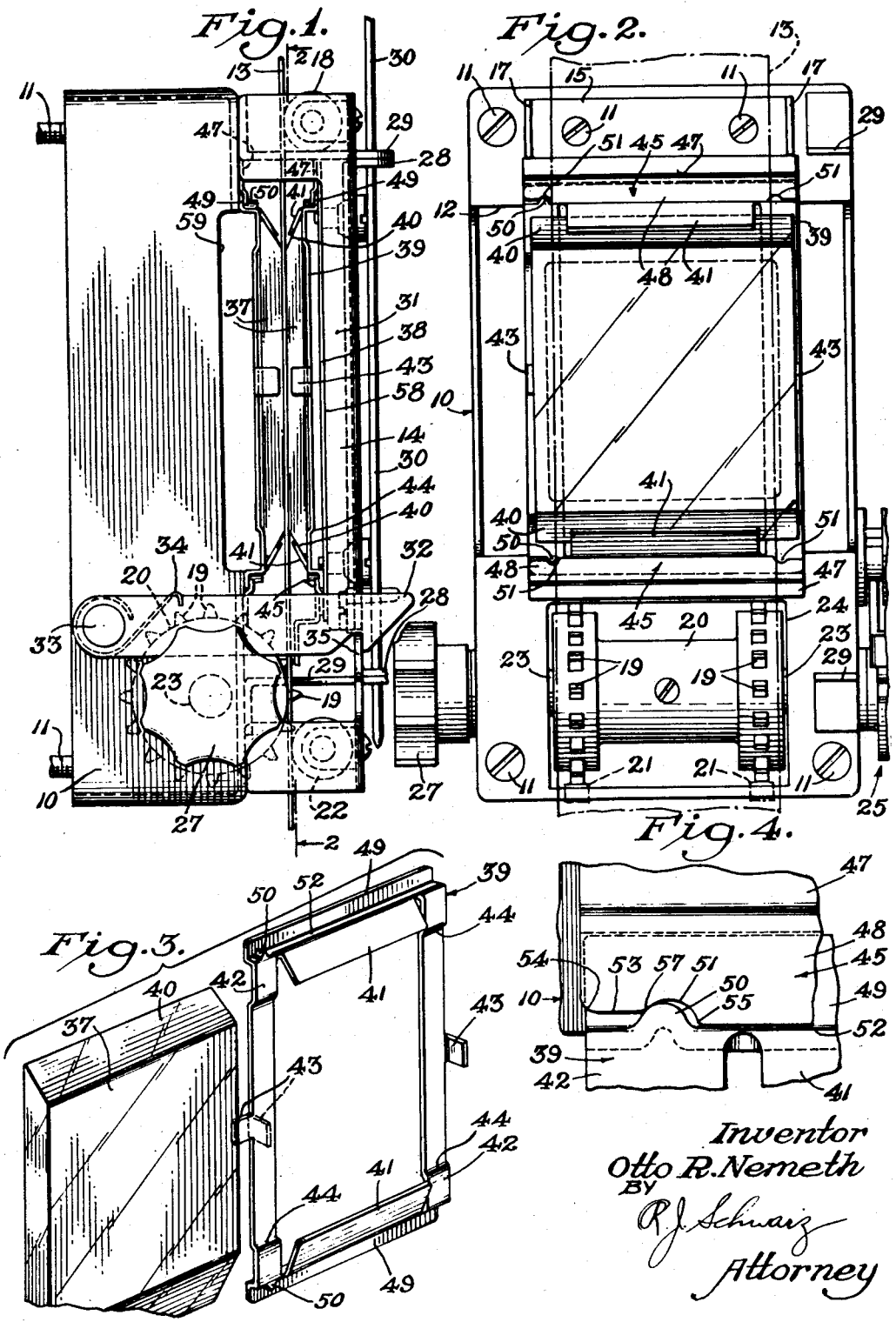
Inventor
Otto R. Nemeth
BY
R. J. Schwarz
Attorney Patented Jan. 4, 1949

2,457,914

UNITED STATES PATENT OFFICE 2,457,914

CONVERTIBLE FILM GATE CONSTRUCTION

Otto R. Nemeth, Chicago, Ill.

Application May 22, 1944, Serial No. 536,723

3 Claims. (Cl. 88—28)

This invention relates to improvements in film gates, and more particularly to film gates for strip film projectors.

Although strip film projectors are particularly adapted for handling relatively long strips of film carrying a succession of framed picture images, it is desirable that provisions be made for alternative use of the projectors with individual transparencies or slides. However, different means are required for handling the film than for handling the slides. Whereas the film must be handled for intermittent frame-by-frame advance and for this must have guiding means and means for holding it flat and free from buckling, slides require provisions for handling a slide carrier adapted to be moved manually into and out of the projection zone.

An important feature of the present invention resides in the provision of a novel film gate construction adapted to be readily converted from handling a strip film to handling a slide or slide carrier, the construction and arrangement being such that the conversion can be effected quickly and simply without tools and without the need for skill other than dictated by ordinary intelligence.

Another feature of the invention resides in the provision of novel readily replaceable film gate structure.

Another feature resides in the provision of novel means for mounting cooperating gripper plates in a strip film gate construction.

Another feature resides in new and improved means for quick-removably securing a plate member such as a film engaging or flattening member in place, as, for example, in the film gate structure of the projector.

Still another feature resides in the provision of dual utility means for interchangeably accommodating not only film gate structure for handling strip film but also adaptor means for handling slides or slide carriers.

Other objects, features and advantages of the invention will be readily apparent from the following description and the accompanying sheet of drawings, in which:

Figure 1 is a side elevational view of a film gate construction embodying the features of the invention.

Fig. 2 is a front elevational view of the film gate with the film door removed, and taken substantially in the plane of line 2—2 of Fig. 1.

Fig. 3 is a perspective assembly view of one of the film gate plates and the plate carrier.

Fig. 4 is a substantially enlarged fragmentary front elevational view showing details of the quick-releasable interlock arrangement by which the plate carrier is held against unintentional sliding dislodgement relative to the supporting rails.

In a form especially convenient for mass production methods of manufacture, assembly, and mounting, a film gate construction embodying the features of my invention is preferably assembled as a self-contained unit upon a supporting frame member 10 (Figs. 1 and 2). In a strong, inexpensive and highly utilitarian form, the frame member 10 may be made from a suitable guage and grade of sheet metal shaped to assume a substantially box-like form of rectangular dimensions, vertically elongated and opening rearwardly to be secured at its rear edges against the lamp housing of a projector (not shown) by means such as bolts or screws 11. Mounting of the frame shell 10 is so effected that a projection opening 12 in the upper portion of the front wall thereof registers with the corresponding projection opening in the lamp housing.

A film strip 13 is adapted to be threaded into place running vertically across the projection opening 12 between an apertured door 14 and the front wall of the frame 10. At the upper or lead in end of the film gate, the film strip 13 is guided by a yoke 15 secured to the upper front margin of the frame 10 and having forwardly projecting guide arm 17 cooperating with a set of guide rollers 18 mounted upon the inside of the upper margin of the door 14. At the lower or trailing end of the film gate the film strip 13 is engaged by teeth 19 on a conventional film sprocket 20 extending into conventional marginal sprocket perforations 21 in the strip. Engagement of the film strip 13 with the sprocket 20 is assured by a set of freely rotatable rollers 22 mounted upon the inner face of the lower margin of the door 14.

As best seen in Fig. 2, the sprocket 20 is mounted upon a shaft 23 rotatably carried by the lower portion of the frame 10 in such manner that the forward peripheral portion of the sprocket 20 projects to a suitable extent through a front wall sprocket opening 24 in the frame below the projection opening 12. The film sprocket 20 is adapted for intermittently advancing the film strip 13 incrementally frame-by-frame by rotation of the shaft 23 through the medium of power driven means 25, herein shown only fragmentarily but disclosed in detail in my copending application Serial No. 536,721, filed May 22, 1944, now Patent No. 2,425,704 issued August 12, 1947. At its opposite end, the shaft 23 carries a manually operable knob 27 by which the shaft and the sprocket 20 are adapted to be rotated for framing adjustment of the film strip 13. If preferred, the sprocket 20 may be operated manually as set forth in my copending application Serial No. 536,722, filed May 22, 1944, and in such event the operator will manipulate the knob 27 not only for effecting intermittent advance of the film strip 13 but also for framing adjustment purposes.

To enable initial threading of the film strip 13 into the film gate, the door 14 is preferably hingedly mounted along one vertical edge to be readily swung open or closed. For this purpose the door carries similar upper and lower forwardly projecting hinge ears 28 cooperating with hinge ears 29 mounted upon and projecting forwardly from the adjacent front wall of the frame 10. All of the hinge ears are coaxially apertured to receive a preferably removable hinge pin 30 enabling the door to be detached when necessary. The frame-carried hinge ears 29 are of such length as to define a proper parallel spacing of the door 14 from the frame 10 in cooperation with a rearwardly extending spacer flange 31 provided along the vertical edge of the door opposite to the hinge. A normally closed condition of the door 14 is maintained by latching means including a latching lever 32 pivotally mounted as at 33 upon the frame member 10 and normally biased by means such as a torsion spring 34 to interlock with a keeper flange 35 protruding into its path from the door 14.

During the intervals between intermittent advance of the film, and especially during projection, the film strip 13 is held stationary, flat and free from buckling in a plane perpendicular to the projection axis by intermittently releasable gripping means, preferably of the kind more particularly disclosed in my copending application Serial No. 536,720, filed May 22, 1944. In brief, the gripping or film-flattening means comprise a pair of transparent film gate plates 37 one of which is mounted on the front face of the frame member 10 and constitutes a window for the projection opening 12 while the other is mounted in cooperatively opposing separable relation thereto upon the inside of the door 14. The door mounted gate plate 37 is carried by an apertured supporting frame panel 38 which is normally resiliently urged rearwardly in spaced parallel relation to the door 14 to carry the gate plate thereon into film flattening position but is retractable to release the film gate plates for advancing the film through the film gate. The manner in which this is accomplished is fully set forth in my last mentioned copending application.

According to the present invention, the film gate plates 37 are supported in a novel, simple and exceedingly convenient manner enabling them to be quickly and easily mounted or demounted and readily adapting the film gate for conversion to use in the manner of a magic lantern wherein transparencies or slides are manually inserted into the projection beam. To this end, and to standardize the structure, each of the film gate plates 37 is preferably of identical form and mounted identically, comprising a vertically elongated, rectangular panel of polished glass of suitable optical quality assembled with a carrying frame 39.

Having particular reference to Fig. 3, the carrying frame 39 may be formed as a sheet metal stamping providing an open, generally vertically elongated, rectangular narrow frame adapted to engage the associated film gate plate 37 marginally, leaving the major area of the panel free and unobstructed for passage of the projection light beam. Assembly of the plate 37 with its carrying frame 39 is effected by relative sidewise sliding movement wherein upper and lower beveled edges 40 on the plate are slid into engagement with upper and lower engagement flanges 41 on the frame headers, forming with frame side bars 42 crotch-like grooves to receive the beveled edges. Sliding separation of the plate and frame is prevented by similar integral side retaining flanges 43 projecting from the side edges of the frame and either of which is adapted to be prebent into plate retaining right angular relation to its bar 42 while the other is bent into panel-retaining right angular relation to its bar 42 after assembly of the plate with the frame.

In order to avoid interference with quick, sliding assembly of the plate 37 with the frame 39 by catching of the plate edge upon the inner edge of the frame bar 42 which is last brought into the assembled relation with the plate, each of the bars 42 is preferably offset as indicated at 44 uniformly throughout its major intermediate extent. By having both of the bars 42 thus offset speed in assembly is assured since assembly of the plate 37 may be effected alternatively from either side of the frame 39.

Quick assembly of the framed film gate plate assembly in the film gate is accomplished by slidably engaging the respective upper and lower edges of the frame 39 with upper and lower rails 45. There is an identical pair of the rails 45 for each of the gate plate assemblies, one pair being carried by the front face of the frame member 10 centered respectively above and below the projection opening 12; and the other pair being carried by the supporting frame panel 38. As shown, all of the rails 45 are of an identical, standardized construction preferably being formed as simple sheet metal stampings of generally Z-bar shape having flat attachment flanges 47 and relatively offset rail flanges 48. The rails 45 are secured to respectively the frame member 10 or the supporting plate 38 by welding or in any other preferred manner. Thus, the rail flanges 48 provide, with the opposed face areas of the respective supports, rail channels for slidably receiving the edges of the respective plate-carrying gate frames 39.

Ample clearance to accommodate the offsets 44 of the gate frame side bars in mounting the gripper assemblies is afforded by offsetting the upper and lower margins of the frame to provide coplanar rail-engaging flanges 49, the outer face plane of which is preferably offset slightly beyond the outer face plane of the offset sections 44 (Fig. 1). As a result, the gate plate assemblies can be mounted in place with great ease and dispatch and there is no danger of their being jarred loose and falling down or toward one another.

In order to hold the gate plate assemblies against unintentional sliding out of place, quick releasable self-locking means are provided on the frame 39 and the rails 45. Accordingly, the frames are provided with locking detent protrusions or nodes 50 and the rails 45 with cooperating notches 51. In a convenient and economical construction, the nodes 50 are formed by distortion or pressing out of the metal of frame shoulders 52 which in the assembled relationship of the frames with the rails 45 oppose the free edges of the rail flanges 48. By preference, each of the gate frames 39 is formed with a pair of the locking nodes 50 in vertical alignment adjacent to one side edge of the frame and preferably at the respective opposite ends of the adjacent frame bar 42. Correspondingly, the rails 45 are each formed with the interlocking notches 51 adjacent to their respective ends and in such position as to receive the nodes 50 when the gripper frames 39 are centered with respect to the rails and thus with respect to the projection opening 12.

At the approach to each of the interlocking notches 51, the associate flange 48 is cut back for clearance as indicated at 53 (Fig. 4) and rounded off at the corner as at 54 in such a manner that the spacing between the major extents of the opposing clearance 53 of each pair of companion rails 45 is slightly less than the distance between the extremities of the nodes on each of the frames 39. Thereby, the nodes 50 will react with the contiguous clearance surfaces 53 to afford a certain amount of frictional binding coaction after camming thereonto from the corners 54. Yet because of the inherent resiliency of the metal of the flanges 48 and the nodes 50 as well as the adjoining metallic areas of the respective members, such binding coaction is readily overcome by relatively slight though appreciable manually applied force exerted in the sliding plane when mounting or demounting the film gate assemblies. The limit of sliding assembly movement is reached when the respective nodes 50 encounter the relatively abrupt inner shoulders formed at 55 by the normal edge extent of the flanges 48 contiguous to the notches 51. Unintentional return sliding of the film gate assembly is prevented by respective cam shoulders 57 provided where the clearances 53 meet the notches 51.

Complete standardization in the construction of the rail bars 45 is obtained by forming each with an identical interlocking notch 51 adjacent to each end of the flange 48. Thus, the rails 45 are interchangeable and during assembly no attention need be paid to the location of the interlocking notches. In this connection it may also be noted that since each of the gripper frames 39 carries an aligned pair of the nodes 50, it can be interchangeably mounted on either the frame member 10 or on the supporting panel 38.

To convert the projector for use with slides, all that need be done is to slidably dislodge and remove the film gate plate assemblies, whereupon the rails 45 become available to receive a slide adapter (not shown). Either the set of rails 45 on the frame member 10, or the set on the supporting plate 38, or both sets of rails may be utilized to support the slide adapter which may be provided with flanges for slidable interengagement with the rails and be locked into position through the medium of the interlock notches 51.

In order to accommodate the slide adapter and enable ready sliding in and out of the slides or carriers, an opening is provided in the side of the film gate structure as by means of a cut-out 58 in the side flange 31 of the door and a cooperating cut away 59 in the opposing side edge of the frame member 10.

From the foregoing it will be apparent that because the various metal parts of the film gate plate assemblies and the rails are adapted to be made of simple sheet metal stampings and are standardized as to structure, enabling interchangeability, manufacturing costs are low for the parts. This interchangeability and standardization of parts also minimizes the labor and equipment required for assembling the apparatus. The freedom from any requirement for screws or other fasteners involving the need for tools or manipulation in assembly is also a distinct advantage and economy. The sturdy, simple structure is quite free from likelihood of disadjustment after the apparatus leaves the factory.

Certain features, such as the transparent plate and carrying frame assembly, the sliding rail mounting of the panel assembly, and the quick-releasable interlock structure are, of course, adaptable for use in connection with other similar structures outside of the film gate, such as in mounting of filter plates and the like.

While I have illustrated and described a certain preferred embodiment of my invention, it is to be understood that I do not thereby intend to limit my invention to the specific forms disclosed, but contemplate that various modifications, substitutions, and alternative constructions may be effected without departing from the spirit and scope of the invention as defined in the appended claims.

I claim:

1. In combination in a film gate construction for strip film projectors, a film gate structure including an offset outwardly extending mounting flange having a shoulder extending in the same direction as the edge of the flange, a rail, supporting means for the rail, said rail having a flange cooperating with the supporting means to form a channel adapted for slidably receiving said mounting flange, the edge of said rail flange closely approaching said shoulder in the assembled relationship of the mounting flange and rail, said rail flange having a stop notch in its edge adjacent to one end and including a cam approach and clearance extending from said end to the notch, and a node on said shoulder and adapted to engage in said notch for interlocking the rail and film gate structure against unintentional sliding displacement, said node and the edge on said flange defining said clearance being coactive to resist free sliding of the panel structure.

2. In combination, a substantially rectangular light-transmitting panel having abrupt longitudinal edges, and a frame for carrying said panel, said frame including header portions adapted for sliding engagement with the end margins of the panel in assembling the panel and frame, and connecting bars for the header portions arranged to lie adjacent to the edge margins of the panel, said connecting bars being offset throughout their major intermediate extent to afford clearance for avoiding interference with said abrupt edges of the panel during assembly of the panel and the frame.

3. In combination in a frame structure for supporting a transparent plate in such manner as to adapt the same for mounting in the projection zone of a picture projector, said structure comprising a sheet metal stamping having headers and connecting narrow frame bars defining an opening adapted to be closed by the transparent plate, said headers comprising shoulders angularly related to said frame bars and mounting flanges extending substantially parallel to the frame bars and cooperatively related to provide a substantially rigid structure particularly resistant to bending about an axis parallel to the frame bars, the shoulders at each end of one of said frame bars having interlock projection nodes extending out of the respective planes thereof in the direction of the adjacent flanges for co-action with mounting structure of the projector and adapted for limited resilient yielding toward the adjacent frame bar but being propped against undue yielding by said bar, and means on said frame for securing the transparent plate in position to close said opening.

OTTO R. NEMETH.

REFERENCES CITED

The following references are of record in the file of this patent:

UNITED STATES PATENTS

| Number | Name | Date |
|---|---|---|
| 1,270,866 | Power | July 2, 1918 |
| 1,424,457 | Fegraeus | Aug. 1, 1922 |
| 1,738,762 | De Vault | Dec. 10, 1929 |
| 1,779,635 | Newman | Oct. 28, 1930 |
| 1,884,729 | Kindelmann et al. | Oct. 25, 1932 |
| 1,897,477 | Holman | Feb. 14, 1933 |
| 2,172,256 | Negel | Sept. 5, 1939 |
| 2,243,160 | Koehl | May 27, 1941 |
| 2,251,077 | Staunton | July 29, 1941 |
| 2,276,735 | Miller | Mar. 17, 1942 |
| 2,299,536 | Dreisbach | Oct. 20, 1942 |
| 2,330,709 | Harper et al. | Sept. 28, 1943 |
| 2,336,196 | Sparling | Dec. 7, 1943 |
| 2,364,670 | Stamy | Dec. 12, 1944 |

FOREIGN PATENTS

| Number | Country | Date |
|---|---|---|
| 324,101 | Germany | Aug. 18, 1920 |